G. H. PARKER.
BULLETIN BOARD.
APPLICATION FILED JAN. 21, 1909.
1,073,866.
Patented Sept. 23, 1913.
3 SHEETS—SHEET 3.
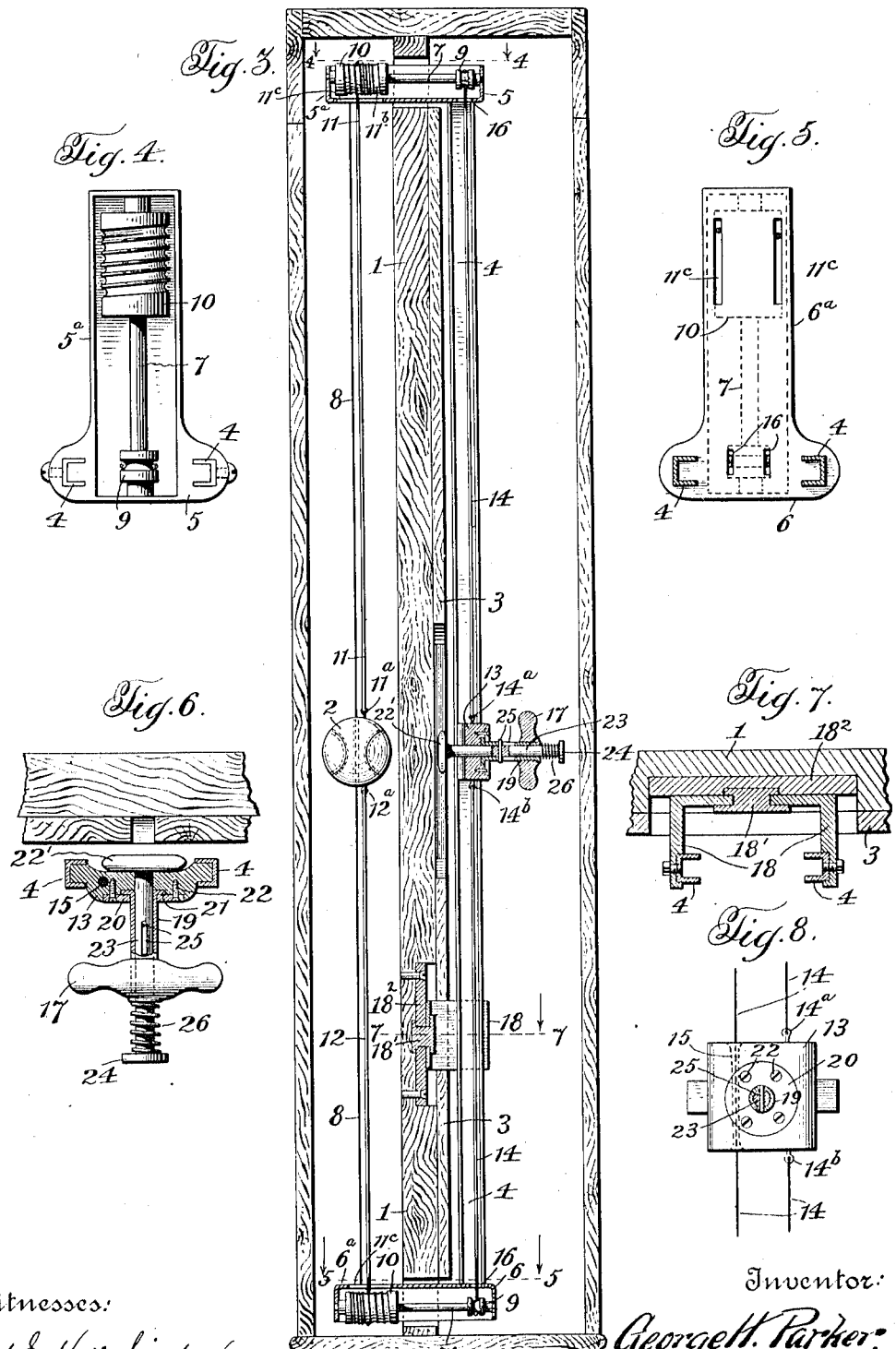

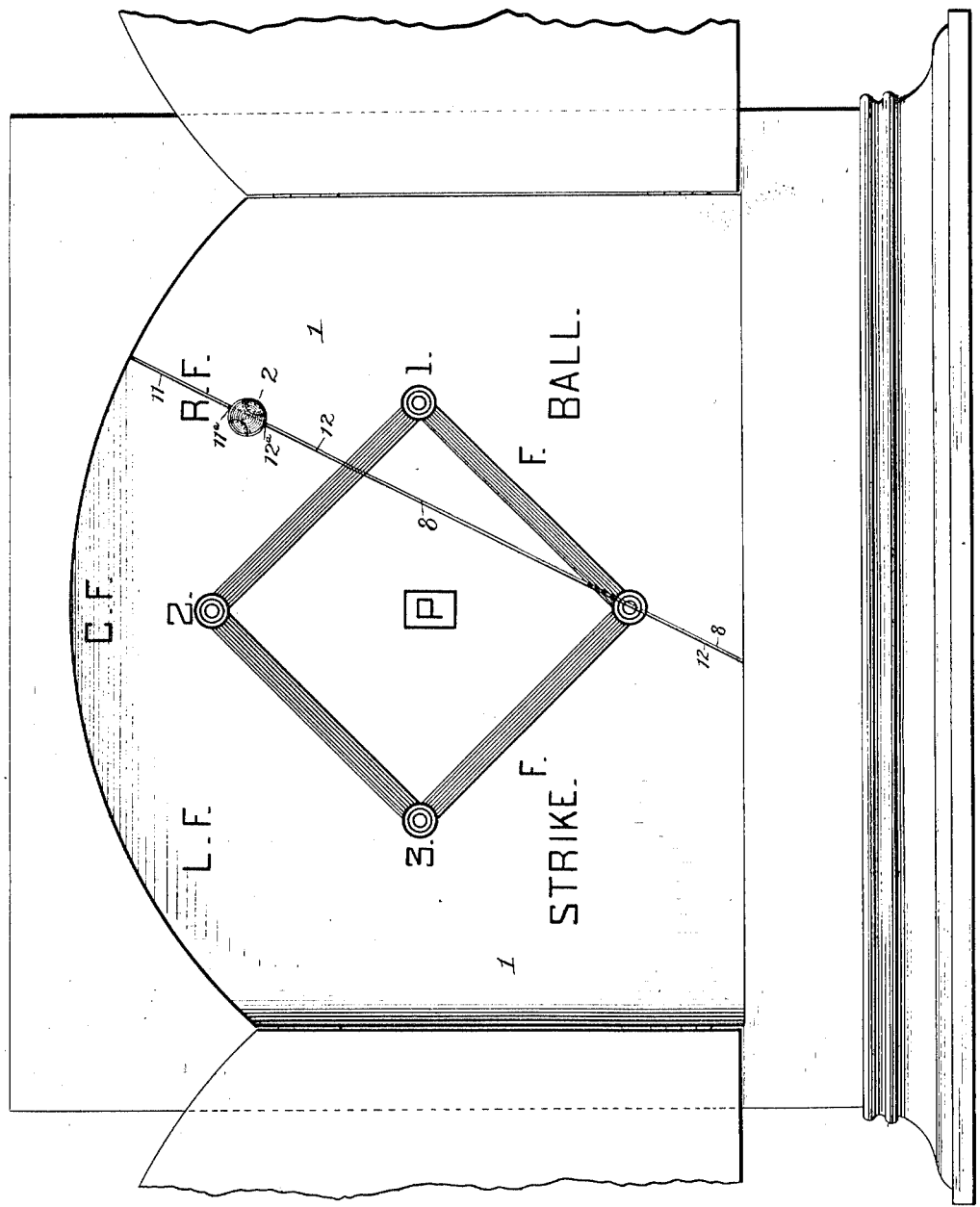

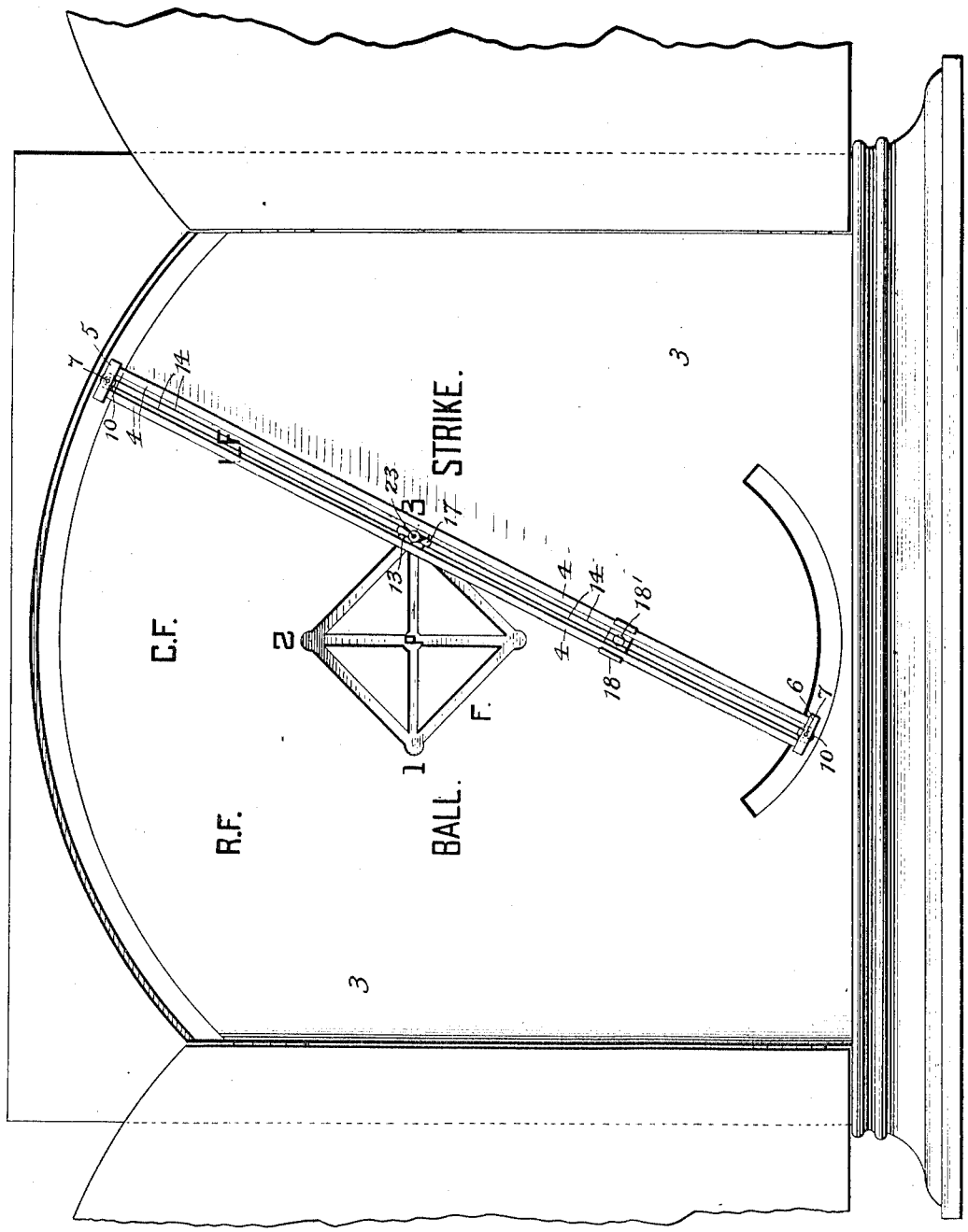

UNITED STATES PATENT OFFICE.

GEORGE HENRY PARKER, OF NEWARK, NEW JERSEY, ASSIGNOR, BY MESNE ASSIGNMENTS, TO MABEL CRANE BAKER, OF STAMFORD, CONNECTICUT.

BULLETIN-BOARD.

1,073,866.  Specification of Letters Patent.  Patented Sept. 23, 1913.

Application filed January 21, 1909. Serial No. 473,560.

*To all whom it may concern:*

Be it known that I, GEORGE HENRY PARKER, a citizen of the United States, residing at Newark, in the county of Essex and State of New Jersey, have invented certain new and useful Improvements in Bulletin-Boards, of which the following is a specification, reference being had therein to the accompanying drawing.

This invention relates to bulletin boards of the type adapted to display graphically the progress of a game of base ball, foot ball or the like.

In my co-pending application, Serial No. 448,530, I have illustrated one form of apparatus for the above purpose wherein is disclosed a field representation to be exposed to view, an indicator adapted to play over said field representation and operating instrumentalities associated with the indicator and spaced therefrom, conveniently to the rear of the field representation, whereby any movement imparted to the operating instrumentalities will result in a corresponding movement to the indicator. The present invention is of this general type and contemplates certain developments and changes over said structure.

As in the construction illustrated in the application above referred to, the present structure is intended to enable the operator to properly position the indicator, which conveniently takes the form of a ball, according to its position during each play of the game.

Primarily the present invention comprises as indicator, an operating device for the indicator, and means whereby movement of the operating device a desired distance will result in a simultaneous movement of the indicator a different distance.

By the present construction, it is possible for the operator to be spaced from the field representation, and by moving the operating device over a diminutive guide or field representation cause an increase movement of the indicator over an enlarged field representation while at the same time the operating device and indicator will assume corresponding positions on the guide and the main field representation. In this way while an enlarged bulletin board with a relatively large field representation thereon may be made use of for the ready inspection of the public, the operating instrumentalities are arranged in compact form and within easy reach of the arm of the operator in all of its positions of adjustment.

Further, the invention includes a field representation, a series of guides corresponding to certain of the field representations at the rear of the field, a ball indicator adapted to play over the field, an operating device for the ball indicator with means for engaging and disengaging the operating device from the guides whereby the operating device in its adjustment may follow said guides to position the ball accurately at certain points on the field representation, for instance the bases, or may be readily disengaged from said guides to impart movement of the ball indicator to any point of the field not provided for by the guides.

Other improvements and novel details in the construction and arrangement of parts will be pointed out in the description hereinafter, which should be read in connection with and will be readily apparent from the accompanying drawing forming a part hereof and wherein a satisfactory embodiment of the invention is illustrated.

Reference being had to the drawings, Figure. 1 is a front elevation of the field board with the apparatus applied thereto, Fig. 2 is a rear view of the same, Fig. 3 is a vertical section of the board and the indicator frame, Fig. 4 is a detail view on line 4—4 of Fig. 3, Fig. 5 is a similar view on line 5—5 of Fig. 3, Fig. 6 is an enlarged detail view of the operating device. Fig. 7 is a section on line 7—7 of Fig. 3, and Fig. 8 is a detail view of the cord 14 and its connection with the operating shoe.

In the said drawings, wherein like reference numerals designate corresponding parts throughout the several views, 1 is a bulletin board having upon its front surface a field representation, which, in the instance illustrated, is in the form of a base ball field, though it is of course to be understood that any field representation may be disclosed. An indicator 2, conveniently shaped after the form of a ball, is adapted to play over the field representation in a manner to be described. A guide surface is provided for the operating instrumentalities of the ball indicator, the guide surface preferably having an auxiliary field representation, and though the same may be placed below the bulletin board proper or otherwise positioned, in the preferred construction is arranged to the rear of the main field representation and may either constitute the rear surface of the board 1 or a supplemental board 3 secured to the board 1 in any desired manner. The guide surface 3 with its field representation has a series of grooves or channels, which, for the purpose of illustration, extend from points representing the home plate and pitcher's box to the several bases, the object of said grooves being to guide the operator in accurately positioning the ball as will be fully explained. A frame suitably mounted to the rear of the field representation 1 and the board 3 comprises upright bars 4 separated one from the other and connected at their respective ends by head blocks 5 and 6. The blocks 5 and 6 are conveniently of metallic construction and formed with extensions $5^a$ and $6^a$ designed to extend to a point beyond the front surface of the board 1. The head blocks 5 and 6 are also channeled for the reception of a shaft 7 mounted for rotary movement therein, and a wire or rod 8 extending between the extensions of the head blocks constitutes a guide for the ball indicator 2, which latter has a central aperture whereby it is sleeved upon the wire or rod for relative sliding movement. Upon one end of the shafts 7 at a point beyond the surface of the board 3 and within the channel of the head blocks is a relatively small wheel 9, suitably a pulley which is fixed for rotation with the shaft while upon the opposite end of the shaft and within the channel of the head blocks is fixed for rotary movement with the shaft an enlarged wheel 10 which conveniently takes the form of a spirally grooved pulley.

11 is a cord, wire or the like secured at one end to the upper surface of the ball at $11^a$ and at its opposite end in any desired manner to the upper spirally grooved pulley 10 as at $11^b$, the cord being arranged to travel in said grooves. Secured to the under surface of the ball as at $12^a$ is an auxiliary cord, wire or the like 12 which is secured at its lower end as the upper cord 11, to the lower spiral grooved pulley 10 in the lower head block. The head blocks have apertures $11^c$ for the passage of the cords 11 and 12. An operating device in the form of a shoe 13 is slidably mounted in any desired manner to the upright bars 4, the shoe 13 being suitably connected to impart rotary movement to the pulleys 9, and to play over the rear surface representation with the result that while the shoe is moved over the relatively small rear field representation to the desired point, owing to the difference in the size of the pulleys 9 and 10, the ball indicator 2 will be simultaneously moved a greater distance while since the main field representation is enlarged the ball indicator will assume a position on its field representation corresponding to that position assumed by the operating shoe relative to the rear representation. A cord, wire or the like 14 is secured in any desired manner as at $14^a$ to the upper surface of the shoe and extends upwardly passing over the upper pulley 9 thence downwardly through an aperture 15 in the shoe around the lower pulley 9 and upwardly to the lower surface of the shoe 13 being connected thereto as at $14^b$, it being noted that the heads 5 and 6 are slotted as at 16 to provide openings for the cord 14.

From the description thus far it will be noted that as the shoe is moved in either direction by an operating handle 17 projecting outwardly from the shoe, the cord 14 which has frictional engagement with the pulleys 9 will impart movement to said pulleys 9 and in turn to the enlarged pulleys 10 thereby winding or unwinding as the case may be the cord 11 about the spiral groove of said pulleys 10, with the result that the ball indicator will be accurately adjusted.

Any suitable means may be provided for movably supporting the carrying frame comprising the upright bars 4, as for instance slidably mounting the frame, but for the purpose of illustration this frame is mounted for pivotal movement on the board 3, and to this end a yoke 18 of substantially U-shape is provided and in the outer end of the arms of the yoke are fixedly secured in any desired manner the upright bars 4. This yoke is pivoted at $18'$ to a plate $18^2$ recessed into and permanently secured to the supporting board 1. Conveniently this pivot is arranged adjacent the home plate of the rear surface representation.

Fitted within an annular recess of the shoe 13 is a hollow spindle 19 projecting outwardly from the shoe which latter has a collar 20 sleeved upon the spindle 19 and overlapping the terminal flange 21 of the spindle whereby the latter is held in place by screws or the like 22 engaging the collar and shoe respectively. The handle 17 is secured in any desired manner to the spindle 19 and may constitute an integral part thereof. A groove engaging member $22'$ shaped to fit the grooves of the guides on the rear representation has an elongated extension 23 extending rearwardly therefrom and loosely passing through a central recess of the shoe 13 and through the spindle 19 and handle 17 to a point there beyond, terminating in an operating knob 24. While the shoe through its extension is mounted for slidable movement relative to the spindle 19 the same is connected to said spindle for rotatable movement with the latter through the medium of a pin and slot connection 25, it being noted that the retaining collar 20 while holding the spindle in place permits rotary movement of the latter. The pin and slot connection 25 just referred to limits the inward and outward movement of the groove engaging device 22', and a spring 26 sleeved upon the extension 23 and interposed between the handle 17 and knob 24 serves to normally hold the shoe in outermost position or in a position without the grooves of the guide surface 3.

The operation of the shoe may be described as follows: The same being mounted for slidable movement on the bars 4 which latter are pivotally mounted, the groove engaging device 22', by a slight pressure on the knob 24 will be moved into the guide grooves and adjusted along the guide grooves as desired and by reason of the fact that the device 22' has a relative rotary movement the same may adjust itself to the various grooves provided. It will be appreciated that since the operating device 22' is in engagement with the grooves it is possible to accurately position the ball indicator at the identical spot indicative of the respective bases for instance, or wherever said grooves may extend. On the other hand should the pressure on the knob 24 be released the spring will automatically release the device 22' from engagement with the grooves when the shoe may be adjusted to any point on the rear field representation, with the result that the ball indicator will in turn assume any point on the main field representation. This is an important feature of the invention since, it is obvious the ball may be quickly adjusted to any point on the field, and again it may be positioned in substantially exact registration with the points provided for by the grooves, as the bases and pitcher's box.

I desire it understood that while the present apparatus is illustrated as applied to a base ball field representation many minor changes may be made to adapt the apparatus to other uses in carrying out the principle of operation.

I claim:

1. In an apparatus of the character described, a main field surface, an auxiliary field surface at the rear of the first mentioned field surface, a suitably supported shaft extending from the front to the rear of the board at one edge thereof, wheels mounted on the shaft, there being one wheel adjacent each end of the shaft, an indicator operatively connected with one of said wheels to play over the main field surface, a guide shoe operatively connected with the other wheel to play over the auxiliary field, the wheels being of different sizes whereby the guide shoe and indicator move different distances at the same time.

2. In an apparatus of the character described, a board having a field representation, a head block arranged adjacent one end of the field, an indicator adapted to play over the field, an operating device at the rear of the field, and means mounted on the head block for converting a relatively short movement of the operating device into an extended movement of the indicator.

3. In an apparatus of the character described, a field board representation, head blocks adjacent the upper and lower edges of the field, an operating shoe to the rear of the field, an indicator to play over the field, and connections between the shoe and indicator including a speed increasing mechanism mounted in the head blocks whereby the shoe and indicator move different distances at the same time.

4. In an apparatus of the class described, a board having a field representation, an indicator adapted to play over the field, a movable frame mounted on the board at the rear thereof, head blocks carried by said frame, an operating device for the indicator mounted on said frame, and means carried by said head blocks for converting the movement of the device into a different movement of the indicator.

5. In an apparatus of the character described, a board having a field representation, head blocks overlying opposite edges of the field, a support at the rear of the board projecting between the head blocks, a shaft mounted in each of the blocks for rotary movement, a relatively small wheel fixed to the shaft, an operating device having flexible connections with said wheel for operating the latter, a different sized wheel fixed on said shaft, an indicator to play over the field representation, and flexible connections between the indicator and the last mentioned wheel.

6. In a base-ball bulletin, the combination with a wall member having at its front a field representation, of an indicator adapted to be moved to any part of the field, flexible means connected to said indicator extending in different directions therefrom and terminating at points adjacent the edges of the field, movable means extending from the front to the rear of the wall member to which the outer ends of the flexible means are secured, and means at the rear of the field for moving said movable means to impart the proper movement to the indicator so that the latter will represent the movements and positions of a ball as played in the bulletined game.

7. In an apparatus of the character described, the combination of a representation, an indicator to play thereover, a guide at the rear of the field representation, a lengthwise movable member connected to the indicator and projecting over the front of said representation, an operating device to the rear of said representation for the said member having a detachable engagement with said guide, and a spring release for the operating device.

8. In an apparatus of the class described, the combination of an upright board having upon the front surface thereof a ball field representation, a ball indicator at the front of the board, a transversely extending shaft at one edge of the board, extending from the front to the rear edge of the board, a pulley at each end of the shaft secured thereto, an operating device at the rear of the board, a cord secured at one end to the operating device and at its opposite end to the pulley on that end of the shaft extending to the rear of the board, and an auxiliary cord secured at one end to the ball indicator and at its opposite end to that pulley on the shaft at the front of the board.

9. In an apparatus of the character described, in combination with a field representation, an indicator therefor, a series of guideways, and a spring held operating device for the indicator movable into and out of engagement with said guideways.

10. In an apparatus of the class described, the combination of a field representation, an indicator to move thereover, a guide surface arranged at a point in the rear of the field, an operating shoe for the indicator movable over the guide surface, a carrying member for the shoe, and a stem on the shoe having slidable engagement with the carrying part whereby the shoe may engage and disengage the guides on the guide surface, and a spring on said stem.

11. In an apparatus of the character described, the combination of a board having upon the front surface thereof a ball field representation, an indicator at the front of the board, a plurality of rotatable members projecting from the front to the rear of said board adjacent the edges of the latter, operating instrumentalities at the rear of the board including flexible connections with one end of said rotary members, and flexible connections at the front of the board between the opposite ends of said rotary members and the indicator.

12. In an apparatus of the class described, a field representation, an indicator adapted to move thereover, grooved guideways arranged at a point beyond the field, and an operating spring pressed shoe for the indicator adjustable into and out of said guide ways.

13. In an apparatus of the character described, a field board representation, head blocks adjacent the upper and lower edges of the field, a support extending between the blocks, an operating shoe slidably connected with said support, an indicator to play over the field, and connections between the shoe and indicator including flexible members projecting between the shoe and indicator and a speed increasing mechanism mounted in the head blocks and connected to the flexible members whereby the shoe and indicator move different distances at the same time.

14. In an apparatus of the character described, a field having an unbroken surface, an indicator adapted to play thereover, a flexible support for the indicator extending outwardly beyond the bounds of the field, a rotary operating device arranged adjacent one edge of the field and secured to said flexible support, movable means to the rear of the field for operating said rotary device, and a guide surface corresponding to certain lines of the field for said means.

15. In a bulletin board, the combination of an upright member having on the front surface thereof, a field representation, an indicator at the front of the upright member, a transversely extending shaft adjacent one edge of the upright member extending from the front to the back surface thereof, a pulley at each end of the shaft, an operating device at the rear of the upright member, a cord extending from the operating device to one pulley, and a cord extending from the other pulley to the indicator, the cords being adapted upon the movement of the operating device to wind and unwind upon the pulleys according to the direction of movement of the operating device to impart movement to the indicator over the field representation.

In testimony whereof I affix my signature in presence of two witnesses.

GEORGE HENRY PARKER.

Witnesses:
W. DAWSON,
STEPHEN KEELE.